United States Patent [19]

Leisenberg

[11] 3,947,237

[45] Mar. 30, 1976

[54] METHOD AND APPARATUS FOR CONTROLLING THE AIR VOLUME IN A TUNNEL KILN ACCORDING TO THE BATCH DENSITY

[76] Inventor: Manfred Leisenberg, Giessener Strasse 46, 6312 Laubach, Hesse, Germany

[22] Filed: Nov. 8, 1974

[21] Appl. No.: 522,315

[30] Foreign Application Priority Data

Nov. 15, 1973 Germany............................ 2357057

[52] U.S. Cl................... 432/11; 236/15 B; 432/144
[51] Int. Cl.² .......................... F27D 3/00; F27B 9/00
[58] Field of Search ....... 432/48, 51, 144, 145, 146, 432/11; 236/15 B

[56] References Cited
UNITED STATES PATENTS

| | | | |
|---|---|---|---|
| 838,270 | 12/1906 | Peters................................. | 432/146 |
| 2,222,809 | 11/1940 | Curran................................. | 432/48 |
| 3,469,828 | 9/1969 | Lane................................... | 432/48 X |

*Primary Examiner*—John J. Camby
*Attorney, Agent, or Firm*—McGlew and Tuttle

[57] ABSTRACT

A method of controlling the heating gases in a kiln having a firing zone and at least one adjacent zone which, for example, may be a preheating zone and/or an after-heating zone, comprises directing combustion products into the firing zone to generate high temperature gases therein and withdrawing a portion of the gases generated after giving up some of the heat in the firing zone upwardly through an exhaust gas flue and sensing the temperature in at least one select location in said kiln and regulating the quantity of gases withdrawn in accordance with the temperature which is sensed. The kiln advantageously includes a preheating zone before the firing zone and an afterheating zone thereafter arranged in a straight line. Burners are arranged to fire downwardly in the firing zone and all of the zones are connected to discharge through a flue. The flue is provided with one or several control elements for regulating the rate of withdrawal of the flue gases which, for example, includes a controllable damper or a controllable circulating fan. A temperature sensing device, such as a thermocouple, is advantageously located in the preheating zone to control either the operation of the fan or the damper in accordance with the temperature sensed in the preheating zone. In addition, or alternatively, a temperature sensing device is located in the afterheating zone for controlling a withdrawal fan for gases connected directly to the afterheating zone. The control may also operate to control the air supplied to the furnace as a means for regulating the temperature in the firing zone and, consequently, in the preheating and afterheating zones.

10 Claims, 1 Drawing Figure

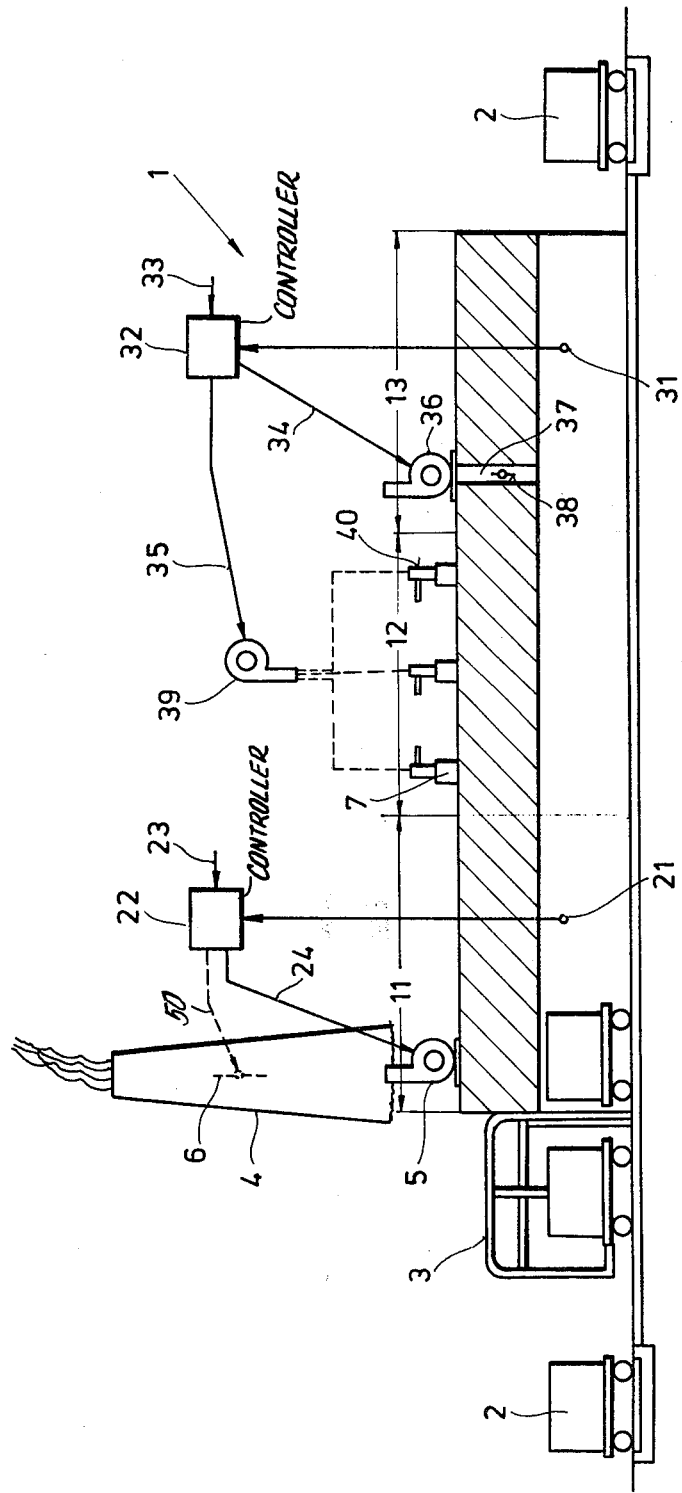

3,947,237

METHOD AND APPARATUS FOR CONTROLLING THE AIR VOLUME IN A TUNNEL KILN ACCORDING TO THE BATCH DENSITY

FIELD AND BACKGROUND OF THE INVENTION

This invention relates in general to the construction and operation of kilns and, in particular, to a new and useful method of controlling air volume in a tunnel kiln in accordance with the batch density, to thereby control the preheating and heating condition, and to the construction of the kiln.

DESCRIPTION OF THE PRIOR ART

Considerable improvements have been achieved in recent times in the development of tunnel kilns in respect to the temperature control and the different control zones and in respect to increasing output due to the use of various cooling systems, particularly for downflow cooling. An unsolved problem, however, is the construction or method of operating a kiln so as to ensure an air volume which is necessary to obtain the required cooling rate and, at the same time, to ensure the required heating of the batch between the lock gate and the firing zone. Expensive trials have been made in this respect with the use of a controller comparing the temperatures in the preheating and cooling zones and keeping the temperature difference at a constant level. Attempts have also been made to operate with a constant flue gas temperature and to predetermine a temperature variation for preheating. None of these trials have resulted in the desired success. The reason for this is that there is no generally applicable system for the optimum operation of a single kiln fed with a great variety of products.

It has been found, for example, that in periodically operating kilns, it is impossible to influence the air volume by permanent corrections and that it is substantially more advantageous to record any change in the batch density in synchronism with the car feeding operation which contains the batch being charged; and, within a certain period of time afteer a new car has been pushed in, to have a reaction in the kiln which would correspond to the new feeding.

SUMMARY OF THE INVENTION

In accordance with the present invention, there is provided a kiln construction and method for controlling the air volume in a tunnel kiln so that it can become adapted to the varying batch densities. The invention provides a tunnel kiln which is fully automatic and can be operated under optimal conditions with a high output and high thermal efficiency without requiring permanent supervision.

The invention provides a kiln having means for recording the temperature in a portion of the kiln during each batch operation and comparing this with a previous condition or batch operation and adjusting the volume of gases which are withdrawn through the flue of the kiln in accordance with any changes which are senses. A thermocouple is advantageously located in a preheating zone before the firing zone and the flue gas withdrawal rate is set in accordance with the operation of a controller which is connected to the temperature sensing device in the kiln and may be set to operate in an adjustable period of time after the feed of a new car with the materials to be baked. It is advantageous to carry out a comparison measurement with the state of the preceding measurement or with an actual value input in definite, adjustable periods of time by means of a further thermocouple which is located in the cooling zone of the kiln or the afterheating portion. A second controller may be connected to the thermocouple arranged in the cooling zone and, depending upon the measurement indicated, the controller may vary the volume in the cooling zone or in the firing zone selectively either by the evacuation of the hot gases or a supply of fresh air. In this latter case, the flue gas volume and/or the volume of cooling and/or the fresh air is advantageously controlled by means of a speed controlled ventilator or fan. If a constant speed ventilator is employed in each case, the control may be effected by control dampers or flaps in the withdrawal duct or the air supply duct.

The apparatus for carrying out the method of controlling the air volume in the tunnel kiln comprises a thermocouple which is provided in the preheating zone of the kiln and is connected to a controller. The controller is connected, for example, to operate a ventilator or fan, or a regulating valve or flap for adjusting the quantity of flow in the flue gas duct under the control of the controller. In addition, a thermocouple is advantageously also located in the cooling zone of the kiln and is connected to a second controller. The second controller is also connected to a ventilator or fan which is driven by a variable speed drive or it is connected to an adjustable valve or flap in the air ducts associated with the cooling zone and/or the firing zone and which operate in accordance with the setting of the controller.

The method or device for controlling the air volume in the tunnel kiln is not only very inexpensive, but it requires little operating attendance. The apparatus may be fitted to the already existing tunnel kilns and the kilns may be operated fully automatically and adapted immediately to the various feeding requirements and batch densities. The controller may be a simple device for controlling the speed of the ventilating fan or the opening of a flow duct in accordance with a compared fed value which advantageously compares the present operational requirements with the operational requirements of the last feed. Thus the flue gas volume can be changed in a relatively short period.

It is easy to understand that, for example, if the batch density suddenly increases, the temperature between the firing zone and the feed end must drop and, consequently, a larger amount of heat can be supplied to the batch. This would means that the temperature drops, as compared to the preceding feed. Thus, the temperature difference is, at the same time, a measure of the increased batch density. Thereby, for example, a potentiometer is turned by means of a servomotor and either the motor of the flue gas ventilator is correspondingly accelerated or the flap is opened. With the invention, it is not necessary to continuously supervise the tunnel kiln but, nevertheless, in a certain period of time, the air volume of the kiln is adapted to the varying batch densities by comparing the temperature in the kiln with a preceding state. To obtain this effect, a thermocouple is mounted adjacent the firing zone or, depending on the wares or materials to be processed, between the firing zone and the lock, or even near the lock. In a certain period of time after the feed, the thermocouple temperature is picked up by the controller and if the temperature on the thermocouple increases, from the previous state, the flue gas volume is automatically throttled. If the temperature drops, the flue gas volume is increased. The balancing operation is restricted to a very short, adjustable period of time.

To explain the operation of such a device by an extreme example; assume that hollow ware and solid stones are fired in a kiln consecutively. The hollow ware is located in the preheating zone and the solid stones in the cooling zone. In condequence, provided the same passage of air through the kiln takes place, the temperature would increase in the front part of the kiln above admissible values. The draft of the ventilator should be slower to prevent a too sudden heating up. Then, however, the cooling in the cooling zone would be insufficient. Therefore, it is necessary to remove heat from the firing zone proper in order to transport the necessary larger cooling volume through the cooling zone. Even such complicated operations can be perfectly controlled by means of the second thermocouple.

If in this kiln, solid stones, for example, come suddenly into the preheating zone, while hollow ware leaves the kiln, the air volume just necessary for the cooling would not be sufficient for heating up the stones. Therefore, additional air is supplied to the firing zone. Up to date burners for gasifiable fuel are able to operate with such air volumes. Thus, in this case, the second controller would demand additional air for the firing zone while no heat is removed from the cooling zone. This makes a tunnel kiln fully automatic and a constant heating rate is obtained independently of the batch density.

Accordingly, it is an object of the invention to provide an improved method of controlling the gas volume in a tunnel kiln which has a firing zone and at least one adjacent preheaing and/or cooling zone, comprising directing combustion products into the firing zone to generate high temperature gases therein and withdrawing a portion of the gases generated after giving up some of its heat in the kiln upwardly through a gas exhaust flue, sensing the temperature in at least one select location of said kiln and comparing the sensed temperature with a previous condition of operation and adjusting the withdrawal rate of the gases in accordance with the sensed differences.

A further object of the invention is to provide a tunnel kiln, which includes a tunnel having means for transporting articles to be fired therethrough, burner means in an intermediate location connected to fire into said tunnel, a temperature sensor located in the tunnel adjacent said firing zone, a flue for withdrawing gases from said tunnel, means associated with said flue for controlling the gases passing therethrough and a controller connected to said sensing means and to said means for withdrawing the gases from said flue having means therein for comparing the sensed temperature with a previous sensed condition and for regulating the operation of said withdrawal means for controlling the volume of gases exiting from the flue in accordance with the sensed differences in operating conditions.

A further object of the invention is to provide a tunnel kiln which is simple in design, rugged in construction and economical to operate.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

The only FIGURE of the drawing is a schematic longitudinal sectional view of a tunnel kiln constructed in accordance with the invention.

DESCRIPTION OF THE PREFERRED EMBODIMENT

Referring to the drawing in particular, the invention embodied therein, comprises a tunnel kiln, generally designed 1, which is adapted to fire a batch of material which is placed on a tunnel kiln car 2. The tunnel kiln 1 is divided into a preheating zone 11, an intermediate firing zone 12, and an afterheating zone or cooling zone 13. The kiln cars 2 are fed into tunnel kiln 1 through an air lock 3 and are moved either continuously or periodically through the kiln. During the passage, the ware to be fired is heated up in preheating zone 11 by the flue gases which are fired in firing zone 12. Firing zone 12 is operated by the burning of gasifiable fuel and air in burners 7 which are mounted in the ceiling of the kiln and fired downwardly. Products are subsequently permitted to cool in the cooling zone 13. A flue gas duct 4 is connected to the tunnel kiln, for example, at the inner end of the preheating zone 11, and it is equipped with a flue gas ventilator or fan 5 and/or an adjusting flap or valve 6 for controlling the flue gas flow through the flue 4 and hence, the volume of the flue gas which is evacuated. The fan 5 may advantageously be a variable speed fan.

In accordance with the invention, the apparatus permits an automatic adaptation of the gas volume in the kiln in accordance with the varying batch densities. For this purpose, a thermocouple 21 is mounted in preheating zone 11 and is connected to a first controller 22. Within a certain time after the feed has begun, the temperature in preheating zone 11 is measured by the thermocouple 21 and compared with a temperature which has been measured previously, for example, after the last feed, by controller 22. If the temperature is lower or higher than the preceding measured temperature, then the batch on the kiln car 2 is obviously of either a greater or lesser density and, accordingly, the volume of the flue gases passing through flue 4 must be adjusted. For this purpose, the controller 22 is connected through a line 24 to provide a control signal for operating the fan 5 and, alternatively or conjointly, it is also connected through a controller conduit 50 which sets the position of the damper valve 6. In this manner, the ventilator fan 5 is either increased or decreased, or the valve 6 is either closed or opened by an amount depending upon the actual temperature change which has taken place, as indicated by the sensor 21. This makes it possible to obtain a heating rate which is constant, independently of the batch density.

In order to obtain a more fully automatic operation of tunnel kiln 1, and even in extreme cases, for example, where the firing of holloware and solid stones follow consecutively, a further thermocouple or sensor 31 is located in the cooling zone 11. Thermocouple 31 is connected to a second controller 32 which, in turn, is connected through signal transmitting lines 34 and 35 to a ventilator fan 36 and air supply fan 39, respectively. Ventilator 36 is mounted for regulating the flow through a ventilating connection 37 into the cooling zone. A damper 38 may also be regulated by a similar connection 34 thereto from the controller 32. Fan 39 supplies combustion air for burners 7. Controller 32 may operated in accordance with an actual value input, as indicated by the connecting line 33, which corresponds to the state of the preceding measurement, or by a reference input, which is fed into controller 32. The blower 36 may be employed for regulating the amount of air which is withdrawn from the cooling zone 13 and this may be used in conjunction with a regulation of the amount of air fed through the fan 39 to the burners 7 which passes through air ducts 40 therefor into the firing zone. The air removal from cooling zone 13 may also be controlled by means of the adjusting flap or damper 38, which is mounted in air duct 37.

If, for example, holloware and solid stones are fired consecutively and the holloware is located in the preheating zone 11, and the solid stones in cooling zone 13, and provided that the same air transport through tunnel kiln 1 is in effect, the temperature in the front part or preheating zone 11 would increase above the admissible value. Consequently, the flue gas ventilator 5 will be slowed down in order to prevent a sudden heating up. This, however, causes the cooling in cooling zone 13 to be insufficient. In such a case, it is necessary to remove heat from the firing zone 12 by means of ventilator 36 and to direct the required larger cooling volume through cooling zone 13.

If, on the contrary, solid stones are located in the preheating zone, while holloware leaves tunnel kiln 1, the air volume just necessary for the cooling would not be sufficient for the heating up of the solid stones. In such a case, additional air is supplied to firing zone 12 through ventilator 39. Thus, by means of a controller 32, additional air is demanded for firing zone 12, while no air is removed from cooling zone 13. The operation, therefore, provides a fully automatic system even with varying batch densities.

While a specific embodiment of the invention has been shown and described in detail to illustrate the application of the principles of the invention, it will be understood that the invention may be embodied otherwise without departing from such principles.

What is claimed is:

1. A method of controlling the gases in a kiln in which ceramic materials are advanced through the kiln for burning therein in various quantities and at varying rates, said kiln having a firing zone in at least one adjacent preheating zone in which the gases act on the material to heat the material prior to burning and at least one cooling zone in which the gases and air in the kiln act on the materials to cool the materials after they are burnt, comprising directing combustion products into the firing zone to generate high temperatures gases therein, advancing material through said preheating zone, said firing zone and said cooling zone, circulating the gases to preheat the material to be burnt in the preheating zone, circulating gases in the cooling zone along with air to cool the material after it is burnt in the firing zone, withdrawing a portion of the gases generated during the movement of the material through the kiln after giving up some of the heat in the kiln and directing them upwardly through a gas exhaust flue, sensing the temperature in at least one select location in said kiln, comparing the sensed temperature with a previously sensed temperature condition in the same select location so as to sense any change in quantity of material being fed thereby, and changing the quantity of gases which are withdrawn from the flue in accordance with the differences in sensed temperature conditions.

2. A method according to claim 1, wherein said tunnel kiln includes a preheating zone adjacent its entrance end, an intermediate firing zone, and a cooling zone adjacent its exit end, said temperature being sensed in said preheating zone and including sensing the temperature in the cooling zone in addition to the preheating zone and in accordance with a change in temperature conditions which are sensed, withdrawing gases from the cooling zone directly.

3. A method according to claim 2, wherein the firing zone is established by firing burners with gasifiable fuel and air and regulating the quantity of air to the burners in accordance with the temperature sensed in the cooling zone.

4. A method according to claim 1, wherein the variable speed fan is connected to said exhaust flue and including regulating the withdrawal of the gases by varying the speed of said fan.

5. A method according to claim 1, including a control damper in said flue and wherein, the control of the gases which are withdrawn is regulated by controlling the position of said control damper.

6. A tunnel tiln for ceramic materials, comprising a tunnel housing having an entrance end and an opposite discharge end, burner means on said tunnel housing firing into the interior of said tunnel housing in an intermediate firing zone to generate high temperature gases to burn the ceramic materials therein, the interior of said tunnel housing having a preheating zone before and a cooling zone after said firing zone, means for circulating the high temperature gases and cooling air so as to preheat materials in said preheating zone and to cool the burnt material in said cooling zone, a flue connected to the interior of said tunnel housing, gas flow control means in said flue for controlling the rate of withdrawal of gases through said flue, temperature sensing means in said tunnel housing, and a controller connected to said temperature sensing means and to said gas flow control means and being responsive to a change in temperature which is sensed to regulate the gas flow control means and to thereby vary the amount of gases and air which are withdrawn through said flue.

7. A tunnel kiln, according to claim 6, wherein said gas flow control means comprises a variable speed fan.

8. A tunnel kiln, according to claim 6, wherein said gas flow control means comprises a movable damper valve for controlling the amount of gases through said flue.

9. A tunnel kiln, comprising a tunnel housing having an entrance end and an opposite discharge end, burner means on said tunnel housing firing into the interior of said tunnel housing in an intermediate firing zone, the interior of said tunnel housing having a preheating zone before and a cooling zone after said firing zone, a flue connected to the interior of said tunnel housing, gas flow control means in said flue for controlling the rate of withdrawal of gases through said flue, temperature sensing means in said tunnel housing, and a controller connected to said temperature sensing means and to said gas flow control means and being responsive to a change in temperature which is sensed to regulate said gas flow control means to vary the amount of gases which are withdrawn through said flue, said temperature sensing means comprising a temperature sensing element located in said preheating zone and a second temperature sensing element located in said cooling zone, and including a second controller connected to said second temperature sensing means, a gas duct for the withdrawal of gases from the cooling zone connected into said tunnel housing into said cooling zone, cooling zone gas flow control means connected to said gas duct and said second controller and being operable by said second controller in accordance with a change in said temperature conditions in said cooling zone for varying the amount of gases moved through said gas duct.

10. A tunnel kiln, according to claim 9, wherein said burner means includes means for supplying air for combustion to said burners connected to said second controller, said means for supplying air to said burners being variable by said second controller to vary the quantity of air delivered to said burners in accordance with a change in conditions sensed by said second controller.

* * * * *